United States Patent [19]

Ogawa et al.

[11] Patent Number: 5,298,716
[45] Date of Patent: Mar. 29, 1994

[54] LASER PROCESSING HEAD AND METHOD FOR OPERATION THEREOF

[75] Inventors: Shuji Ogawa; Atsuhiko Kawamura, both of Aichi, Japan

[73] Assignee: Mitsubishi Denki Kabushiki Kaisha, Tokyo, Japan

[21] Appl. No.: 49,450

[22] Filed: Apr. 20, 1993

[30] Foreign Application Priority Data

Sep. 22, 1992 [JP] Japan .................................. 4-252743

[51] Int. Cl.$^5$ ............................................. B23K 26/14
[52] U.S. Cl. ............................ 219/121.67; 219/121.78; 219/121.84
[58] Field of Search ..................... 219/121.67, 121.72, 219/121.84, 121.78, 121.79

[56] References Cited

U.S. PATENT DOCUMENTS 4,031,351 6/1977 Martin .............................. 219/121.67
5,237,148 8/1993 Aoki et al. ....................... 219/121.7

FOREIGN PATENT DOCUMENTS 63-273588 11/1988 Japan .
2-160194 6/1990 Japan .

Primary Examiner—C. L. Albritton
Attorney, Agent, or Firm—Sughrue, Mion, Zinn, Macpeak & Seas

[57] ABSTRACT

A laser cutting head has a nozzle as well as a lens disposed in a holder that is moveable by a mechanical drive along the laser beam axis and has a working gas supply port at the nozzle side of the head. The head also has an annular groove that is defined by concentric internal and external cylinders and a drive gas supply port in the external cylinder at the laser supply side of the head. An annular piston is formed at the laser beam application side end of the movable lens holder, that is disposed in the annular groove. The piston may be pressed toward the nozzle side of the head by the pressure of drive gas supplied through the drive gas supply port. The drive gas pressure and the area of the piston is selected to define an offsetting pressure for reducing the effect of the cutting gas on the lens and lens holder.

11 Claims, 3 Drawing Sheets

LASER PROCESSING HEAD AND METHOD FOR OPERATION THEREOF

BACKGROUND OF THE INVENTION

1. Field of the Invention

The present invention relates to a laser processing head which laser cuts or welds a workpiece by condensing and applying a laser beam and injecting cutting gas to the workpiece, and a method of operation therefor.

2. Description of the Background Art

FIG. 5 is a sectional view of a conventional laser cutting head shown in Japanese Patent Unexamined Publication No. Sho. 63-273588. In this drawing, the numeral 1 indicates a laser beam, 2 denotes a cutting lens for condensing the laser beam optically, and 3 represents a moveable holder which holds the cutting lens 2. The holder 3 is inserted within the external cylinder 4 and is moveable in both directions coextensive with the in the axis of the laser beam 1. Teeth 3a are formed in a side face of the holder to engage with a worm gear 6. A motor 5 drives the moving holder 3 via a worm mechanism, consisting of the worm gear 6 and the teeth 3a. The motor 5 and worm mechanism constitute a drive section acting to drive the moving holder 3. A sealant 7, which serves as a seal for cutting gas 9, also serves as a guide for the moving holder 3. A nozzle 8, which includes a nozzle end 8a, applies a laser beam to a workpiece 10 after it is condensed by the cutting lens 2. Nozzle 8 also includes a cutting gas supply port 8b to receive the cutting gas 9 for injection onto the workpiece 10. 2a and 2b indicate positions of the cutting lens 2 in a movable range, and the corresponding focal points of the laser beam 1 are indicated by 11a and 11b. Typically, the volume defined by the cylinder 4 in the laser source direction is open to atmospheric pressure.

The operation of the laser cutting head will now be described in accordance with FIG. 5. The laser beam 1 is condensed optically by the cutting lens 2 and applied to the workpiece 10. The cutting gas 9, which is generally dry air in the case of aluminum cutting, is injected onto the workpiece 10 from the front end 8a of the nozzle 8 on the same axis as the condensed laser beam 1.

The cutting sequence of the laser cutting head will now be described. When the cutting lens 2 is located at position 2a, the corresponding focal point 11a is located at the surface of the workpiece 10, and the workpiece 10 is pierced at a cutting start point. When a hole is made, the motor 5 is driven under the control of a control signal from a numerical control apparatus, not shown, to move the moving holder 3 toward the workpiece 10 via the worm gear 6. The cutting lens 2 moves to position 2b and the corresponding focal point 11b is located at the bottom of the workpiece 10.

At this focal point 11b, laser cutting is performed with respect to the hole pierced. Since cutting gas pressure at this time must be large enough to blow the metal fused by laser energy toward the bottom surface of the workpiece 10, the internal gas pressure of the nozzle 8 is set to an extremely high pressure, e.g., in a range between 5 kgG/cm$^2$ and 9 kgG/cm$^2$.

Hence, high cutting gas pressure is applied to portions A of the lens and lens holder, marked with arrows (↑) in the drawing. For example, if the cutting lens is 50 mm in diameter and the cutting gas pressure applied is 8 kgG/cm$^2$, the thrust which presses the moving holder 3 toward the laser beam 1 application side (top side in the drawing) by means of the cutting gas pressure is approximately 300 kgf because the outside diameter of the moving holder 3 holding the cutting lens 2 is approximately 70 mm. Clearly, the motor 5, the worm gear 6 and other parts constituting the drive section for driving the moving holder 3 must be designed to resist a greater force or thrust.

In the conventional laser cutting head arranged as described above, the nozzle side end portions of the cutting lens and the moving holder that supports the cutting lens encounter a comparatively large force that results from the cutting gas that is supplied through the cutting gas supply port and flows within the nozzle for injection onto the workpiece from the nozzle tip. By contrast, the opposite end of the holder and lens is open to ambient air pressure. As a result, the drive means consisting of the motor, the worm gear and other parts for reciprocating the moving holder in the direction of the laser beam must be relatively large in size.

SUMMARY OF THE INVENTION

It is accordingly an object of the present invention to overcome the disadvantages in the conventional art by providing a laser cutting head having a holder that may be moved in response to a small driving force and may be moved by a drive means having a comparatively small size.

It is a further object of the present invention to provide a balancing pressure on one side of a moveable lens holder structure that is operative to offset the pressure generated by a cutting gas at an opposite side of the lens and lens holder.

It is yet another object of the invention to provide balancing pressures to one side of a moveable lens holder structure from either a separate gas source or the same gas source, as is used for the cutting gas.

These and other objects are accomplished by a first embodiment in which a laser cutting head has a nozzle as well as a lens disposed in a holder that is moveable by a mechanical drive along the laser beam axis and has a working gas supply port at the nozzle side of the head. The head also has an annular groove that is defined by concentric internal and external cylinders and a drive gas supply port in the external cylinder at the laser supply side of the head. An annular piston is formed at the laser beam application side end of the movable lens holder, that is disposed in the annular groove. The piston may be pressed toward the nozzle side of the head by the pressure of drive gas supplied through the drive gas supply port.

As another feature of the laser cutting head, the drive gas pressure application area of the annular piston is substantially equal to a cutting gas pressure application area consisting of the nozzle side end portions of the cutting lens and the moving holder.

A further aspect of the invention is that a part of cutting gas supplied to the head nozzle is branched to be supplied as drive gas, whereby the force which presses the annular piston is applied to substantially balance against force which presses the nozzle side end portions of the cutting lens and the moving holder independently of the variations of the pressure of the cutting gas and drive motor.

Another feature is a laser cutting head which includes gas cylinders for providing a drive gas pressure that presses a moving lens holder in the direction of a head nozzle, whereby a working gas force which presses the nozzle side end portions of a lens and the moving holder is opposed by at least the drive gas alone or in combination with a mechanical drive means for selectably moving the moving holder in the direction of a laser beam.

Yet a further feature is the branching of part of the cutting gas supplied to the nozzle for additional supply as drive gas.

DESCRIPTION OF THE PREFERRED EMBODIMENTS

Figure 1:
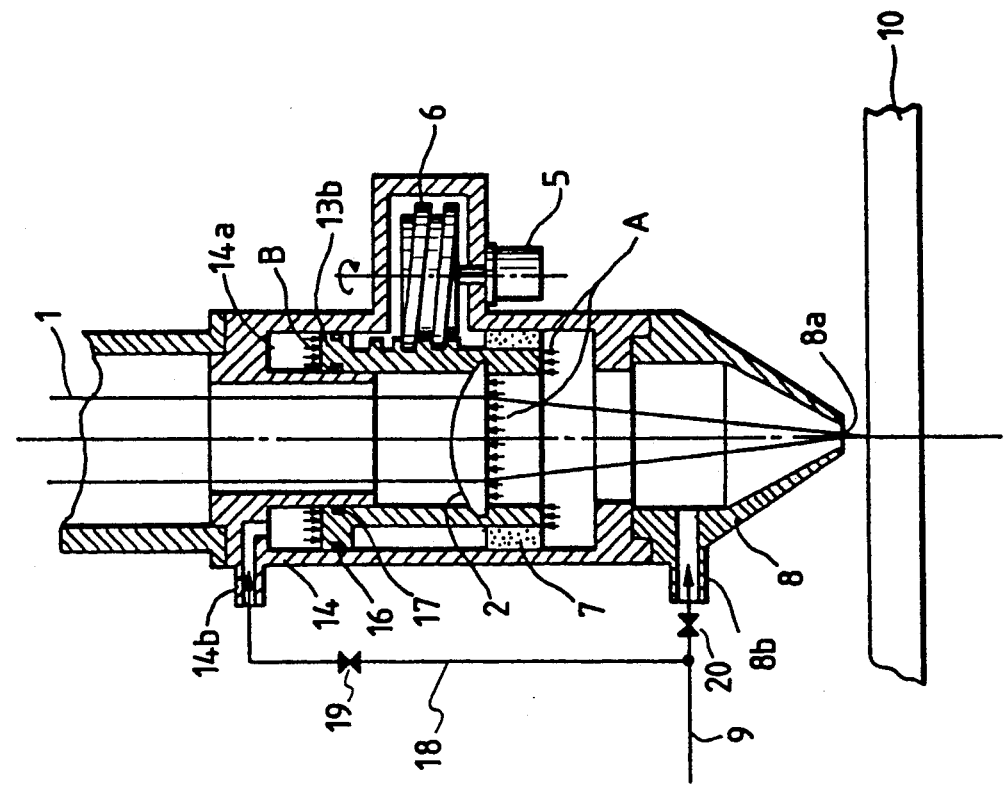
FIG. 1 is a sectional view of a laser cutting head in accordance with a preferred embodiment of the invention.

A first embodiment of the invention will now be described with reference to FIG. 1, wherein reference characters identical to those in the background art designate identical or corresponding parts.

FIG. 1 is a sectional view illustrating the arrangement of a laser cutting head. In this drawing, the moving holder 13, which holds the cutting lens 2 for condensing the laser beam 1, is movably disposed in an external cylinder 14. The holder 13 is moveable in up and down directions along the axis of the laser beam 1 (vertically movably in the drawing). Teeth 13a are formed in the side face of the moving holder 13 to engage with the worm 6. An annular piston 13b is formed at one end of the moving holder 13. An external cylinder 14 has the nozzle 8 affixed at one end and the moving holder 13 is inserted movably therein. An annular groove 14a has been formed to accept the annular piston 13b of the moving holder 13. The annular piston 13b is inserted slidably in the annular groove 14a formed in the external cylinder 14 and is sealed by O rings 16, 17.

A gas 15 (for example, factory air or the like) is supplied from the outside as a drive gas for driving the annular piston 13b and is supplied at a controllable pressure. Portions A marked with arrows (↑) in the drawing indicate a cutting gas 9 pressure application surface at the nozzle 8 side end faces of the cutting lens 2 and the moving cylinder 13 which holds the cutting lens 2. Portion marked with arrows (↓) in the drawing shows an external drive gas 15 pressure application surface at the annular piston 13b.

The operation of the laser cutting head will now be described in accordance with FIG. 1. The laser cutting method is omitted since it is identical to that of the background art and only the method of applying balancing pressures will be described. In FIG. 1, at the time of laser cutting, the cutting gas 9 enters the nozzle 8 and the gas pressure in the nozzle 8 is set to 5 to 9 kgG/cm$^2$. Hence, thrust which pushes up the annular piston 13b toward the top side in the drawing is generated on the cutting gas 9 pressure application surface at the nozzle 8 side end faces of the cutting lens 2 and the moving holder 13 holding the cutting lens 2, i.e., portions A marked with arrows (↑) in the drawing.

Since the external gas (e.g., factory air) acting as the drive gas 15 is being applied at the same time to a small chamber made by the annular groove 14a in the external cylinder 14 and the annular piston 13b, this drive gas 15 causes thrust which pushes down the annular piston 13b toward the bottom side to be produced on the external drive gas 15 pressure application surface at the annular piston 13b, i.e., portion B marked with arrows (↓) in the drawing. When the friction, resistance, etc., of the cutting lens drive section are ignored, the net force of:

(area of portions A)×(cutting gas pressure)−(area of portion B)×(external gas pressure)

is applied to the drive section. Namely, as compared to portions A)×(cutting gas pressure) is applied to the drive section, the net force applied to the drive section in the present embodiment is reduced by the opposing force of (area of portion B)×(external gas pressure).

If the area of portion B cannot be large enough due to structural limitations of the device, the drive gas 15 pressure may be adjusted to reduce the net force resulting from the difference between the thrust generated by the cutting gas 9 and the thrust generated by the drive gas 15, optionally allowing it to even be zeroed.

As described above, the laser cutting head shown in FIG. 1 includes a small chamber defined by the annular groove 14a and the portion of the annular piston 13b on the laser beam application side of the cutting lens 2. The piston 13b is mechanically joined to the cutting lens 2 by the structure of the moving holder 13. Thus, when a drive gas pressure is applied to the small chamber from the outside, the annular piston 13b is provided with a force which opposes the force produced by the cutting gas pressure from the workpiece surface side (nozzle 8 side) of the cutting lens 2. As a result, the force generated by the drive section need only overcome the net force resulting from the opposing pressures and can be made extremely small as compared to that of the background art.

Figure 2:
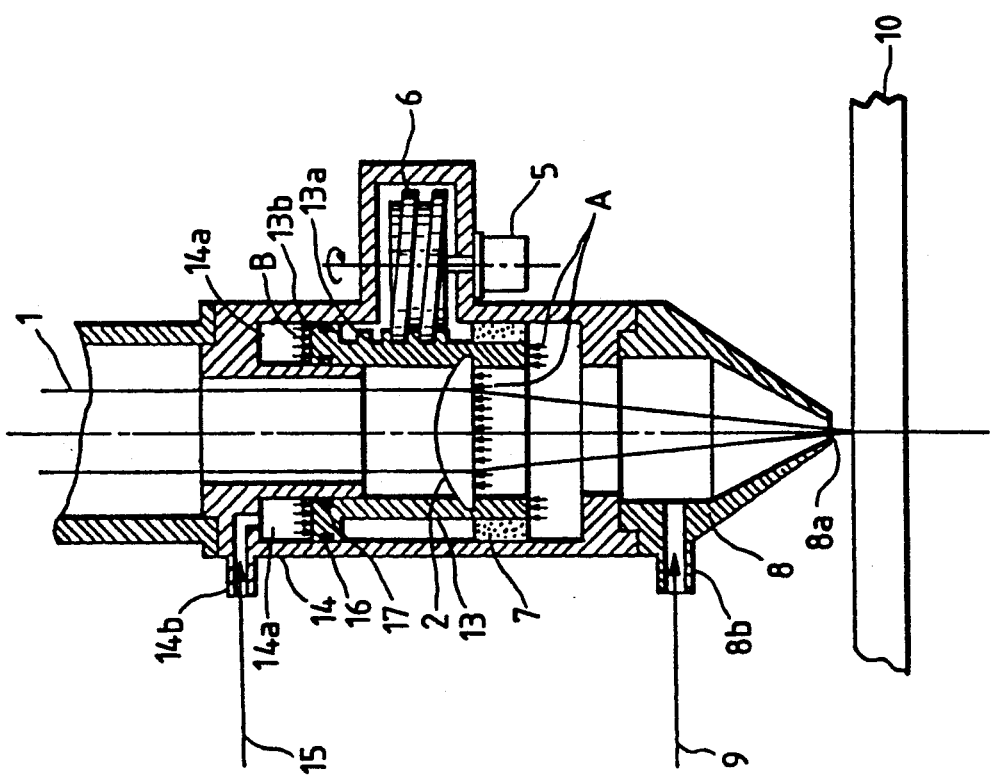
FIG. 2 is a sectional view of a laser cutting head in accordance with another preferred embodiment of the invention.

A second embodiment of the invention will now be described in accordance with FIG. 2, which is a sectional view of a laser cutting head. In this drawing, the cutting gas 9 is supplied to the nozzle 8 and is also branched as drive gas to be supplied to a small chamber made by the annular piston 13b and the annular groove in the external cylinder 14. The laser cutting head shown in FIG. 2 is identical in arrangement to the one shown in FIG. 1, with the exception of the piping 18 for the drive gas supplied to the small chamber made by the annular piston 13b and the annular groove 14a in the external cylinder 14. It should be noted that the pressure application area of the annular piston 13b is substantially equal to the sum of the cutting gas 9 pressure application areas of the workpiece surface side (nozzle 8 side) surface of the cutting lens 2 and a structure supporting the cutting lens 2. Where the areas are different, valve structures 19, 20 can be inserted into the piping 18 to provide a desired pressure level.

The operation of the laser cutting head shown in FIG. 2 will now be described. In the present embodiment, the cutting gas 9 is branched to be supplied to the small chamber made by the annular groove 14a in the external cylinder 14 and the annular piston 13b. If the friction, resistance, etc., of the drive mechanism are ignored, thrust applied to the motor 5, the worm 6, etc., constituting the drive section of the moving holder 13 serving as a cutting lens drive is as follows:

[(area of portions A) (area of portion B)] × (cutting gas pressure)

Therefore, by making the area of portions A marked with arrows ( ↑ ) in the above expression, i.e. the sum of the cutting gas 9 pressure application areas of the nozzle 8 side end faces of the cutting lens 2 and the moving holder 13 holding the cutting lens 2, substantially equal to the area of portion B marked with arrows ( ↓ ), i.e., the pressure application area of the annular piston 13b, the thrust applied to the moving holder 13 toward the top side in the drawing can be substantially zeroed independently of the pressure variation of the cutting gas 9.

In the laser cutting head shown in FIG. 2, as described above, the pressure application area of the annular piston 13b is substantially equal to the sum of the cutting gas 9 pressure application areas of the workpiece surface side (nozzle 8 side) surface of the cutting lens 2 and the structure supporting the cutting lens 2, and the branched cutting gas is supplied as the drive gas. Hence, load applied to the drive section of the cutting lens is reduced to substantially zero independently of the pressure variation of the cutting gas applied at the time of cutting, the thrust generated by the drive section is extremely small as compared to that of the background art, and the cutting gas employed as the drive gas instead of external gas does not require new gas piping, etc., to be provided. Further, where additional control is desired, or where the areas to which the opposing pressures are applied are different, controlled valves 19, 20 can be used to provide relative pressures that permit the zeroing of the net force that the drive section must overcome.

Figure 3:
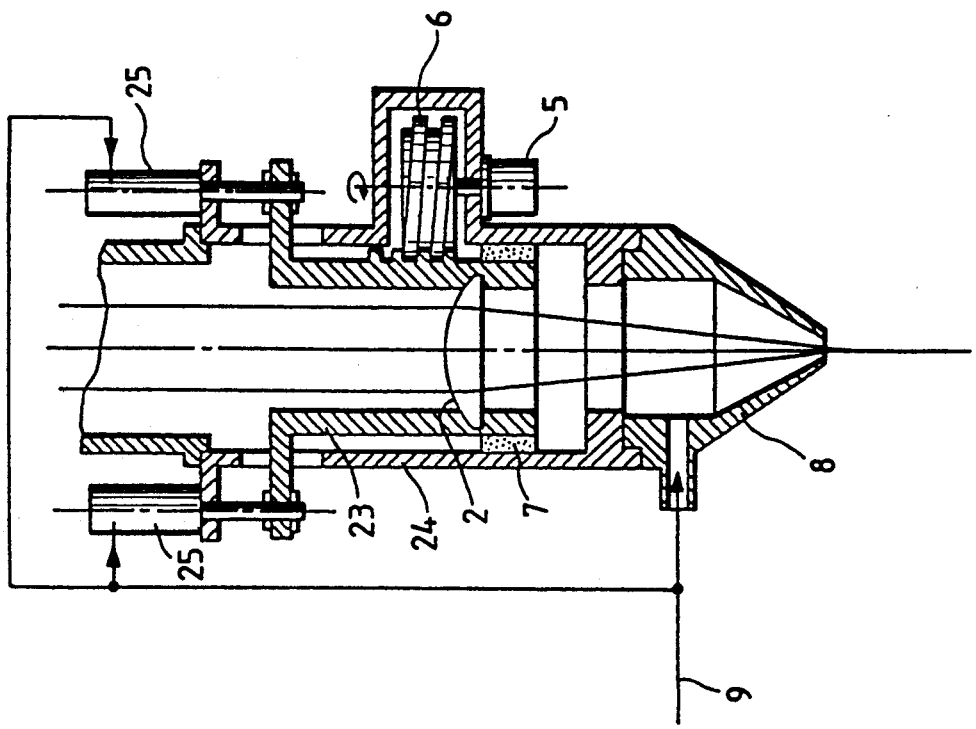
FIG. 3 is a sectional view of a laser cutting head in accordance with a further preferred embodiment of the invention.

A third embodiment of the invention will now be described in accordance with FIG. 3, which is a sectional view of a laser cutting head. In this drawing, 23 indicates a moving holder fitted with the cutting lens 2, and 24 denotes an external cylinder. 25 represents pneumatic thrusters that are secured to the external cylinder 24. Pistons (not shown) of the pneumatic thrusters 25 are coupled with the moving holder 23 and pressure is controlled by the drive gas 15 supplied from the exterior. The laser cutting head shown in FIG. 3 is identical in arrangement to the one shown in FIG. 1, with the exception that the pneumatic thrusters 25 are provided in place of the small chamber made by the annular piston 13b of the moving holder 13 and the annular groove 14a of the external cylinder 14 provided for the one shown in FIG. 1 and the moving holder 23 is coupled with the pistons of the pneumatic thrusters 25.

The operation of the laser cutting head in FIG. 3 will now be described. This operation is similar to that of the first embodiment shown in FIG. 1, i.e., at the time of laser cutting, the cutting gas 9 enters the nozzle 8 and the gas pressure in the nozzle 8 is set in a range of 5 to 9 kgG/cm². Hence, thrust which pushes up the moving holder 23 toward the top side in the drawing is generated on a cutting gas 9 pressure application surface at the nozzle 8 side end faces of the cutting lens 2 and the moving holder 23 holding the cutting lens 2. Meanwhile, the drive gas 15 is supplied from the outside to the pneumatic thrusters 25 and produces thrust which pushes down the moving holder 23 coupled with the pistons of the air cylinders 25 toward the bottom side.

The pressure of the drive gas 15 supplied from the outside to the pneumatic thrusters 25 is controlled properly to balance the thrust which pushes up the moving holder 23 toward the top side in the drawing and the thrust which pushes down the moving holder 23 toward the bottom side by means of the pneumatic thrusters 25, whereby a difference between the thrust produced by the cutting gas 9 and the thrust produced by the drive gas 15 can be zeroed.

As described above, the laser cutting head shown in FIG. 3 is provided with the pneumatic thrusters 25 which mechanically operate jointly with the drive section of the cutting lens, i.e., the drive section of the moving holder 23, in terms of their thrust. Thrusters 25 are generally available on the market, whereby manufacturing costs can be reduced and the effects of the first embodiment can be provided. As compared to the laser cutting head shown in FIG. 1, the one in the present embodiment does not require the annular piston, the annular groove, etc., in the head, increasing the freedom of design.

Figure 4:
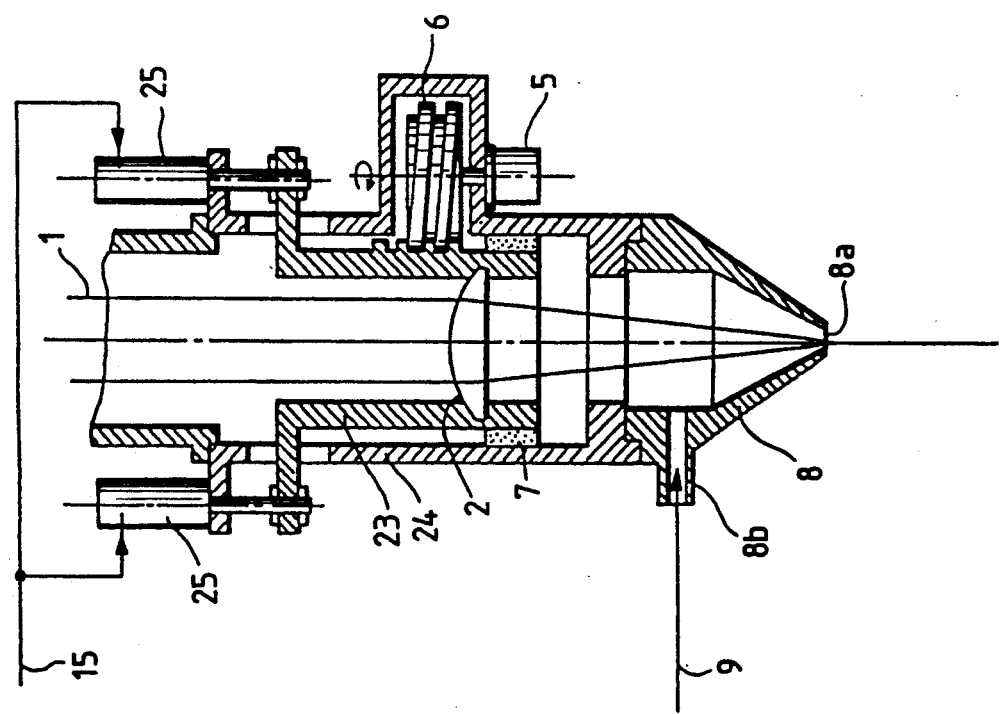
FIG. 4 is a sectional view of a laser cutting head in accordance with a preferred embodiment of the invention.
Figure 5:
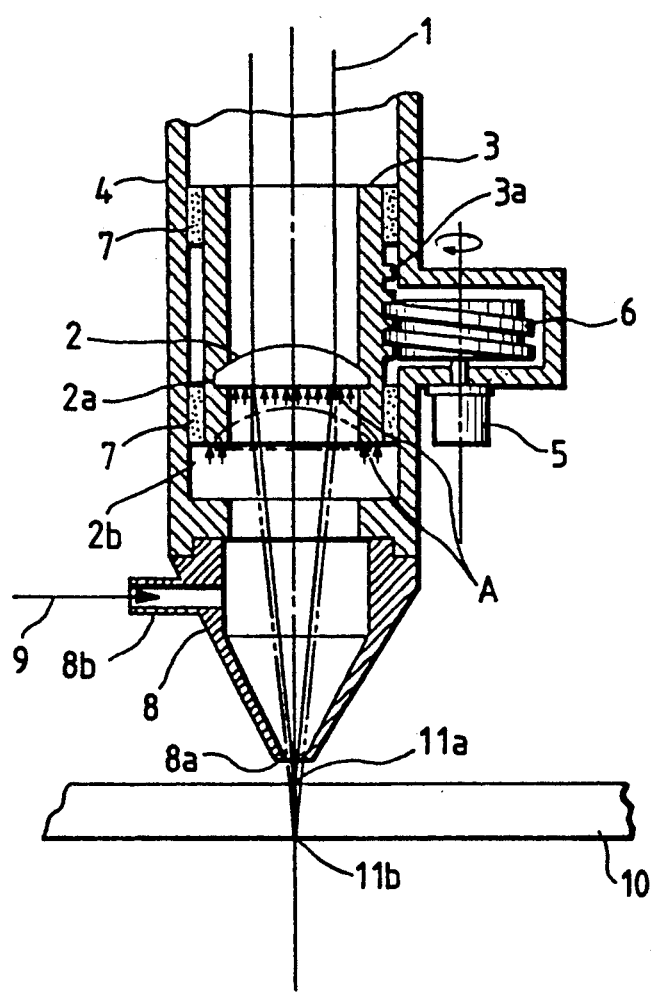
FIG. 5 is a sectional view of a conventional laser cutting head known in the art.

A fourth embodiment of the invention will now be described in accordance with FIG. 4, which is a sectional view of a laser cutting head. In this drawing, the cutting gas 9 is supplied to the nozzle 8 and is also branched as drive gas to be supplied to the air cylinders 25. The laser cutting head shown in FIG. 4 is identical in arrangement to the one shown in FIG. 3, with the exception of the piping of the drive gas supplied to the air cylinders 25. It should be noted that the sum total of the pressure application areas of the pistons (not shown) of the two air cylinders 25 is substantially equal to the sum total of the cutting as 9 pressure application areas of the workpiece surface side (nozzle 8 side) surface of the cutting lens 2 and a structure supporting the cutting lens 2.

The operation of the laser cutting head shown in FIG. 4 will now be described. In the present embodiment, the cutting gas 9 is branched to be supplied to the pistons of the two air cylinders 25 secured to the external cylinder 24. Hence, if the friction, resistance, etc., of the drive mechanism are ignored, thrust applied to the motor 5, the worm 6 and other parts constituting the drive section of the moving holder 23 serving as a cutting lens drive, or the thrust applied to the moving cylinder 23 toward the top side in the drawing, can be zeroed substantially, independently of the pressure variation of the cutting gas 9, since the sum of the cutting gas 9 pressure application areas of the nozzle 8 side end faces of the cutting lens 2 and the moving holder 13 holding the cutting lens 2 is substantially equal to the sum total of the pressure application areas of the pistons (not shown) of the air cylinders 25.

As described above, the sum of the cutting gas 9 pressure application areas of the nozzle 8 side end faces of the cutting lens 2 and the moving holder 13 holding the cutting lens 2 is substantially equal to the sum total of the pressure application areas of the pistons (not shown) of the air cylinders 25, and the branched cutting gas is supplied as the drive gas. Hence, the operation of the present embodiment is identical to that of the second embodiment and the air cylinders 25 are generally available on the market as in the third embodiment, whereby manufacturing costs can be reduced and the freedom of design is improved.

The motor and worm gear combined to constitute the cutting lens drive system in any of embodiments 1 to 4 may also be replaced by a motor and a ballscrew, a motor and a helicoid mechanism, or a similar mechanism to produce identical effects.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A laser processing head for directing a laser beam, having an optical axis, from a laser source side to a workpiece side and onto a workpiece together with cutting gas from a supply, comprising:
    an external cylinder having an annular groove;
    a cutting lens disposed transversely to said optical axis for condensing said laser beam;
    a nozzle disposed at one end of said external cylinder for applying said condensed laser beam and injecting supplied cutting gas to a workpiece;
    a moving holder, holding said cutting lens and inserted in said external cylinder;
    drive means disposed adjacent said external cylinder for reciprocatively moving said moving holder along the optical axis of said laser beam;
    an annular piston formed at the end of said laser source side of said moving holder and being sealingly inserted in the annular groove of said external cylinder;
    means for supplying a drive gas to said annular groove; and
    whereby said annular piston is pressed toward said nozzle by the pressure of drive gas supplied to said annular groove.

2. A laser processing head as set forth in claim 1, wherein said drive gas supplying means comprises means for providing at least a branched part of the cutting gas supplied to the nozzle.

3. The laser processing head as defined in claim 1, wherein the sum total of the drive gas pressure times the drive gas application area is substantially equal to the sum total of the cutting gas pressure times the cutting gas pressure application area comprising the nozzle side end portions of the cutting lens and the moving holder holding said cutting lens.

4. The laser processing head as defined in claim 1, wherein the drive gas pressure application area of the annular piston formed on the moving holder is substantially equal to a cutting gas pressure application area comprising the nozzle side end portions of the cutting lens and the moving holder holding said cutting lens and the drive gas supplied is the branched part of the cutting gas supplied to the nozzle.

5. A laser processing head for directing a laser beam having an optical axis, comprising:
    an external body;
    a cutting lens for condensing said laser beam;
    a nozzle disposed at one end of said external body for applying said laser beam and injecting supplied cutting gas to a workpiece;
    a movable holder for holding said cutting lens, said holder being inserted in said external body to define at least a first gas surface area and being reciprocatively moveable along said optical axis of said laser beam;
    drive means for reciprocatively moving said moving holder along said optical axis of said laser beam; and
    means for supplying drive gas to said first surface area to press said moving holder in the direction of said nozzle.

6. A laser processing head as set forth in claim 5, wherein said drive gas supplying means comprises a gas supply separate from said cutting gas supply.

7. A laser processing head as set forth in claim 6, wherein said drive gas supplying means comprises at least one cylinder disposed on said external body.

8. A laser processing head as set forth in claim 6, wherein said drive gas supplying means comprises means for providing at least a branched part of the cutting gas supplied to the nozzle.

9. The laser processing head as defined in claim 5, wherein the sum total of the drive gas pressure times the drive gas application area is substantially equal to the sum total of the cutting gas pressure times the cutting gas pressure application area consisting of the nozzle side end portions of the cutting lens and the moving holder holding said cutting lens.

10. The method of adjusting a laser processing head containing a cutting lens that defines a laser source side and a nozzle side, said lens being mounted in a holder that is moveable along the laser beam axis for purposes of focusing the laser beam at the nozzle side, wherein a cutting gas is supplied at a first pressure to the nozzle side for machining, comprising:
    supplying a drive gas at a second pressure to said holder on said laser source side; and
    mechanically driving said holder, whereby said mechanical driving force and said second pressure force overcomes the force of said first pressure against said lens and said holder.

11. The method of adjusting a laser processing head as set forth in claim 10, further comprising, providing said gas at a first pressure and gas at a second pressure from a common gas source.

* * * * *